United States Patent [19]

Spakowski et al.

[11] Patent Number: 5,730,261
[45] Date of Patent: Mar. 24, 1998

[54] DAMPER CONTROL VALVE

[75] Inventors: Joseph George Spakowski; Kenneth James Flory, both of Rochester, N.Y.; Grant Michael Wheeler, Cortland, Ohio

[73] Assignee: General Motors Corporation, Detroit, Mich.

[21] Appl. No.: 583,836

[22] Filed: Jan. 11, 1996

[51] Int. Cl.[6] ............................................. F16F 9/46
[52] U.S. Cl. .......................................... 188/299; 188/316
[58] Field of Search ............................. 188/299, 313, 188/322, 13, 316

[56] References Cited

U.S. PATENT DOCUMENTS

| | | | |
|---|---|---|---|
| 3,161,261 | 12/1964 | Bryant | 188/316 |
| 4,650,042 | 3/1987 | Knecht et al. | 188/299 |
| 4,902,034 | 2/1990 | Maguran | 188/299 |
| 5,163,538 | 11/1992 | Derr et al. | 188/318 |
| 5,163,706 | 11/1992 | Maguran | 188/299 |
| 5,282,645 | 2/1994 | Spakowski | 188/299 |
| 5,467,851 | 11/1995 | Handke | 188/299 |

FOREIGN PATENT DOCUMENTS

| | | |
|---|---|---|
| 0364757 A | 4/1990 | European Pat. Off. |
| WO 8905929 A | 6/1989 | WIPO |
| WO 9216772 A | 10/1994 | WIPO |

*Primary Examiner*—Robert J. Oberleitner
*Assistant Examiner*—C. T. Bartz
*Attorney, Agent, or Firm*—Jeffrey A. Sedlar

[57] ABSTRACT

A damper control valve includes a body having an inlet, a main outlet and a pilot outlet with a valve disc normally substantially closing the inlet off from the outlet. The valve disc has a continuously open orifice that permits restricted fluid communication between the inlet and the pilot outlet. An armature normally closes the pilot outlet. The armature is movable by a coil to open the pilot outlet and in response, the valve disc independently moves in response to a pressure differential to open the main outlet to the inlet.

6 Claims, 5 Drawing Sheets ial power are consumed than conventionally utilized damper control valves. A valve construction according to the present invention, wherein the armature and the valve disc are provided as two separate components, permits the device to be constructed relatively inexpensively with liberal tolerancing requirements.

DAMPER CONTROL VALVE

BACKGROUND OF THE INVENTION

The present invention relates to a damper control valve and more particularly, to a variable state, solenoid operated damper control valve for use with a semi-active vehicle suspension damper.

U.S. Pat. No. 5,163,538 discloses a semi-active suspension damper that exhibits two operating modes: a first mode having a low damping force when the solenoid operated control valve is open; and a second mode having a high damping force when the solenoid operated damper control valve is closed. When the damper control valve is open and the damper is operating under low damping force conditions, the associated vehicle experiences a relatively soft ride as a result. When the damper control valve is closed the damper is operating under high damping force conditions and the associated vehicle experiences a relatively firm ride as a result.

With such a controlled arrangement, the damper generally operates in a state wherein the solenoid operated valve is energized. With conventional solenoid operated damper control valves the coil of the solenoid operates directly on the main flow controlling valve element as an armature. This type of solenoid operation tends to consume a certain amount of electrical power. Generally, it is preferable to minimize power consumption. In addition, in other known prior art arrangements where a valve element moves in and out of an opening to control flow through a damper control valve, tight tolerances must be maintained between the valve assembly and the solenoid operator assembly to ensure proper closure.

SUMMARY OF THE INVENTION

It is an aspect of the present invention to provide a damper control valve which consumes lower amounts of electrical power than conventionally utilized valves and which may be constructed with liberal tolerance requirements. According to this aspect a damper control valve is provided which includes a body having an inlet and both a main outlet opening and a pilot outlet opening. The body of the damper control valve includes a cavity through which flow is directed from the inlet to the pilot outlet and the main outlet of the valve.

A valve disc having a continuously open restrictive orifice is carried in the cavity and normally substantially closes off the inlet from the cavity. An armature is separately carried by the body of the damper control valve and normally closes the pilot outlet. A solenoid coil is carried by the body near the armature and when energized, moves the armature to compress the spring and open the pilot outlet. In response to opening of the pilot outlet the valve disc independently moves to open the main outlet and permit flow from the inlet to the main outlet through the cavity.

When the pilot outlet is closed by the armature fluid pressure at the inlet is communicated to the backside of the valve disc through the restrictive orifice and is applied to a larger area of the valve disc as compared to that on the front side at the inlet opening. Therefore, fluid pressure supplied to the inlet assists in maintaining the valve disc in a seated position to close off the inlet.

Since the solenoid only operates to move an armature which opens and closes the pilot opening rather than the main flow path through the valve, lower amounts of electrical power are consumed than conventionally utilized

DETAILED DESCRIPTION OF THE PRESENTLY PREFERRED EMBODIMENTS

Figure 1:
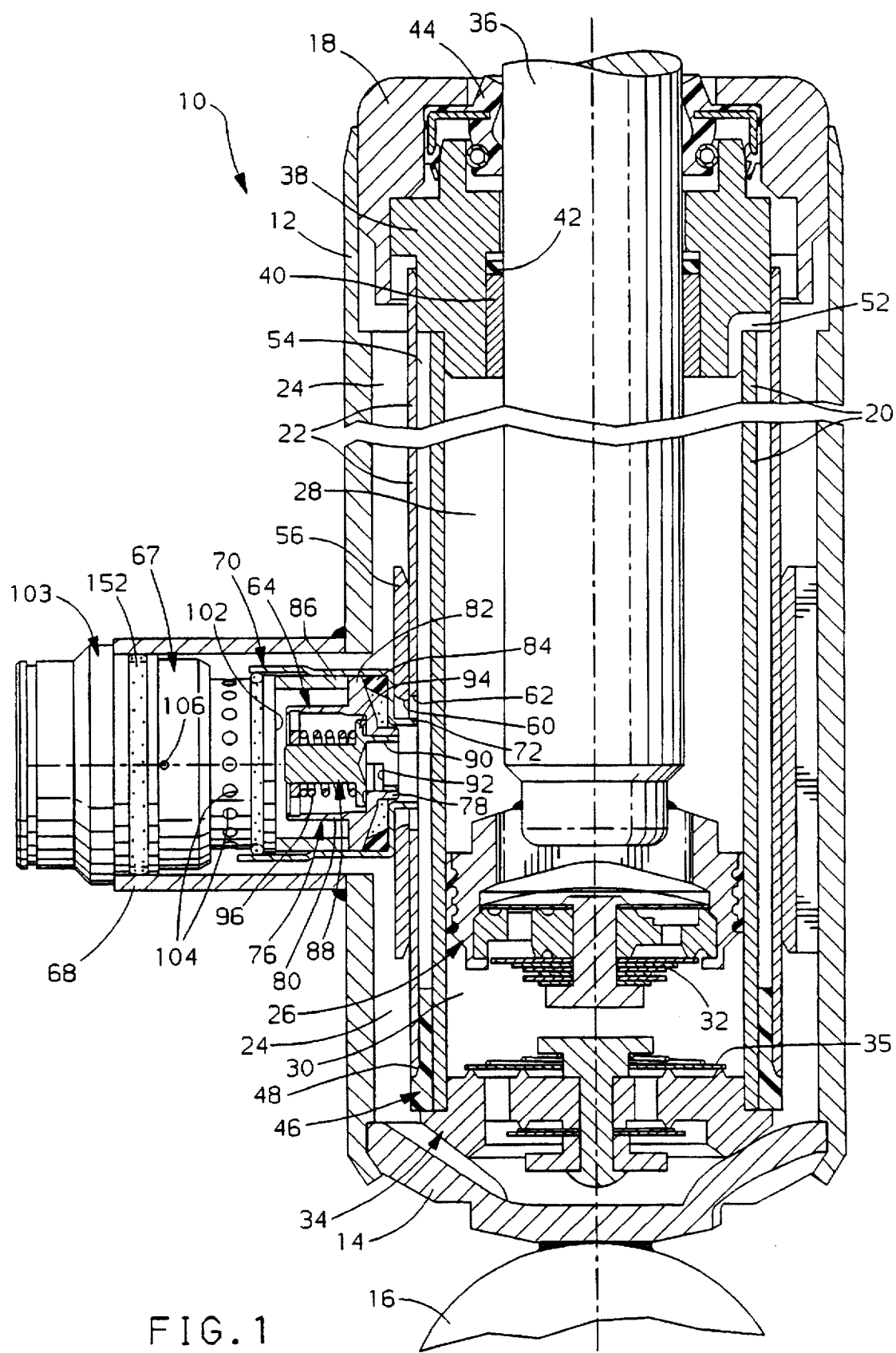
FIG. 1 is a fragmentary cross-sectional view of a semi-active hydraulic damper with a damper control valve.

Referring to the drawings, illustrated in FIG. 1 is a semi-active hydraulic damper 10. The damper 10 includes an outer reservoir tube 12 closed at its lower end by a base cup 14. A mount 16 is provided at the base cup 14 for securing the damper 10 to a vehicle suspension element (not illustrated) in a conventionally known manner. At the opposite end of the reservoir tube 12 from the base cup 14, a seal cover 18 in combination with a seal 44 and a rod guide 38 form a secure closure for the damper 10.

A cylinder tube 20 is carried within reservoir tube 12 and is centered therein by engaging a cylinder end assembly 34 which is seated on base cup 14. An intermediate tube 22 is spaced between the cylinder tube 20 and the reservoir tube 12 and is maintained in position by engaging rod guide 38 at its top end and a circumferential shoulder 48 of an adapter 46 at its lower end.

A piston 26 is slidably mounted inside the cylinder tube 20 and divides the interior volume thereof into a rebound chamber 28 and a compression chamber 30. The piston 26 carries a valve assembly 32 which provides a restricted flow path between the compression chamber 30 and the rebound chamber 28 as the piston 26 reciprocates in the cylinder tube 20. A compression valve assembly 35 is carried by the cylinder end assembly 34 and controls the flow of fluid between the reservoir 24 and the compression chamber 30 during operation of the damper 10.

A piston rod 36 is attached at its lower end to the piston 26 and is connected at its upper end (not illustrated) to a suspension element of the vehicle (not illustrated). The piston rod 36 passes through the rod guide 38. The rod guide 38 is press-fit into the upper end of the cylinder tube 20 and is held in position by the seal cover 18. An annular bushing 40 is carried in a central opening of the rod guide 38 and engages the piston rod 36. A high pressure seal ring 42 is provided about the rod guide 38 adjacent the bearing 40. A seal assembly 44 is seated on the rod guide 38 and engages the piston rod 36.

A plurality of ports, representative of which is port 52, are formed in the rod guide 38 to provide fluid communication between the rebound chamber 28 and an annular by-pass channel 54 formed by the space between the cylinder tube 20 and the intermediate tube 22. The adapter 46 blocks the lower end of the by-pass channel 54 and forms a fluid seal therefor.

A sleeve 56 is pressed onto the intermediate tube 22 and includes an opening 60 aligned with an opening 62 provided in the intermediate tube 22. Openings 60 and 62 provide fluid communication between the by-pass channel 54 and a low level damping valve assembly 64 which is mounted in series with a solenoid operated damper control valve 67. A body 103 engages the valve boss 68 and holds the damper control valve 67 therein. Fluid passing between the annular bypass channel 54 and the reservoir 24 passes through both the low level damping valve 64 and the damper control valve 67.

The low level damping valve assembly 64 is housed in a hollow cylindrical seal cup 70. The seal cup 70 has a protruding annular inlet portion 72 which is received into openings 60 and 62. A valve cage indicated generally at 76 is a substantially cylindrical member having an annular extension 78 at a first end and an annular skirt 80 at a second end. A retainer flange 82 is provided between the annular extension 78 and the skirt 80. A seal 84 is carried between the seal cup 70 and the retainer flange 82. An annular spacer 86 is positioned between the retainer flange 82 and the damper control valve 67.

A movable valve element 88 is substantially cylindrical in configuration and includes an opening 90 and a slot 92. An annular stop flange 94 is formed about the central portion of the valve element 88. The valve element 88 is inserted inside the annular skirt 80 so that the stop flange 94 rests on an inner surface of the annular extension 78. A spring 96 is provided about the outer portion of the valve element 88 to maintain the annular extension 78 in a seated position.

Figure 2:
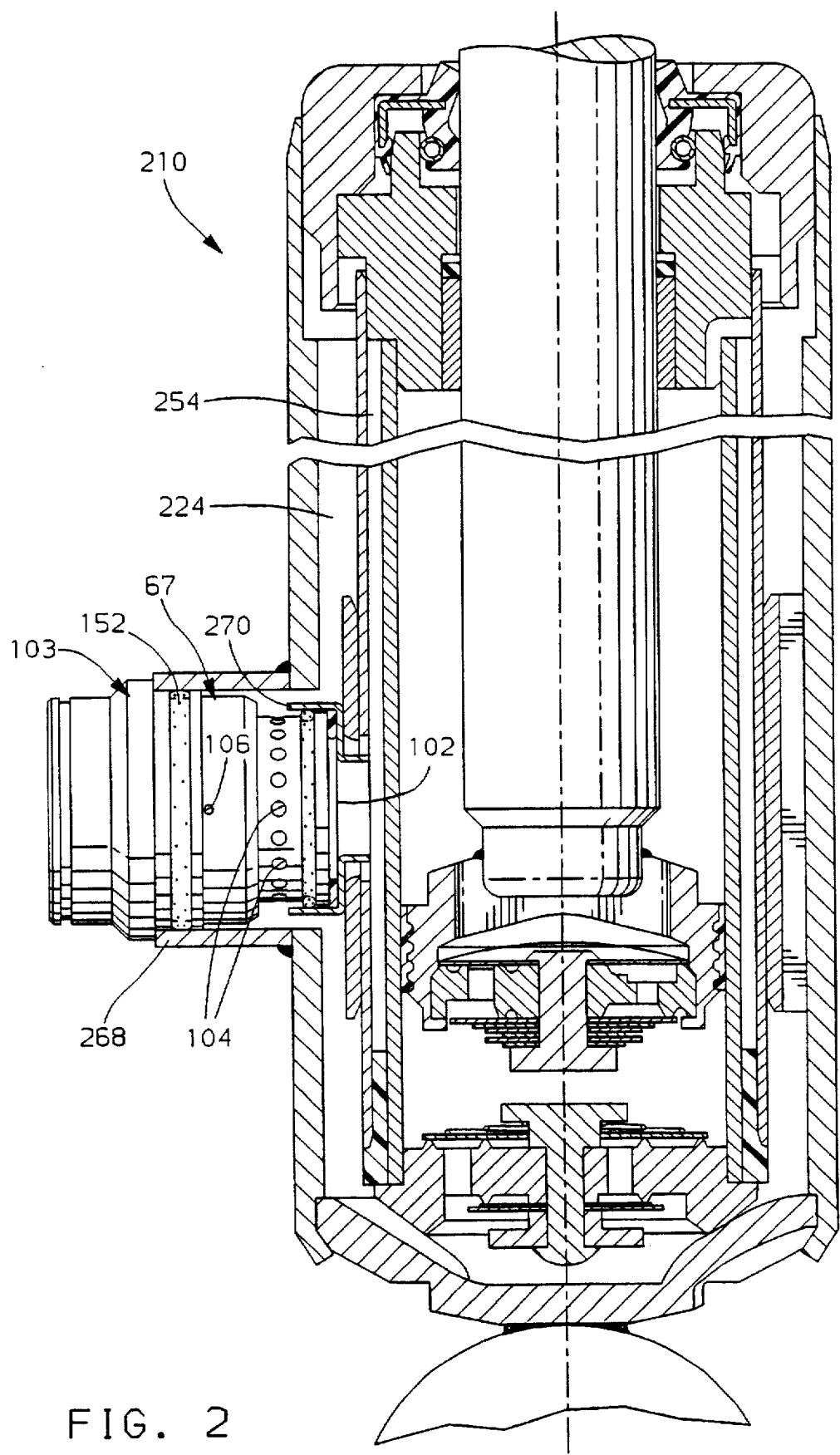
FIG. 2 is a fragmentary cross sectional view of a semi-active hydraulic damper with a damper control valve.

FIG. 2 illustrates the optional use of the damper control valve 67 in a damper 210 without an accompanying low level damping valve as illustrated in FIG. 1. The damper 210 is similar in construction to the damper 10 of FIG. 1. The damper control valve 67 is mounted on the damper 210 and is received within a shortened valve boss 268. The damper control valve 67 engages a seal cup 270 that is adapted for use without a low level damping valve. In this embodiment, fluid flowing between the annular bypass channel 254 and the reservoir 224 passes through the damper control valve 67 and is controlled solely thereby.

Figure 3:
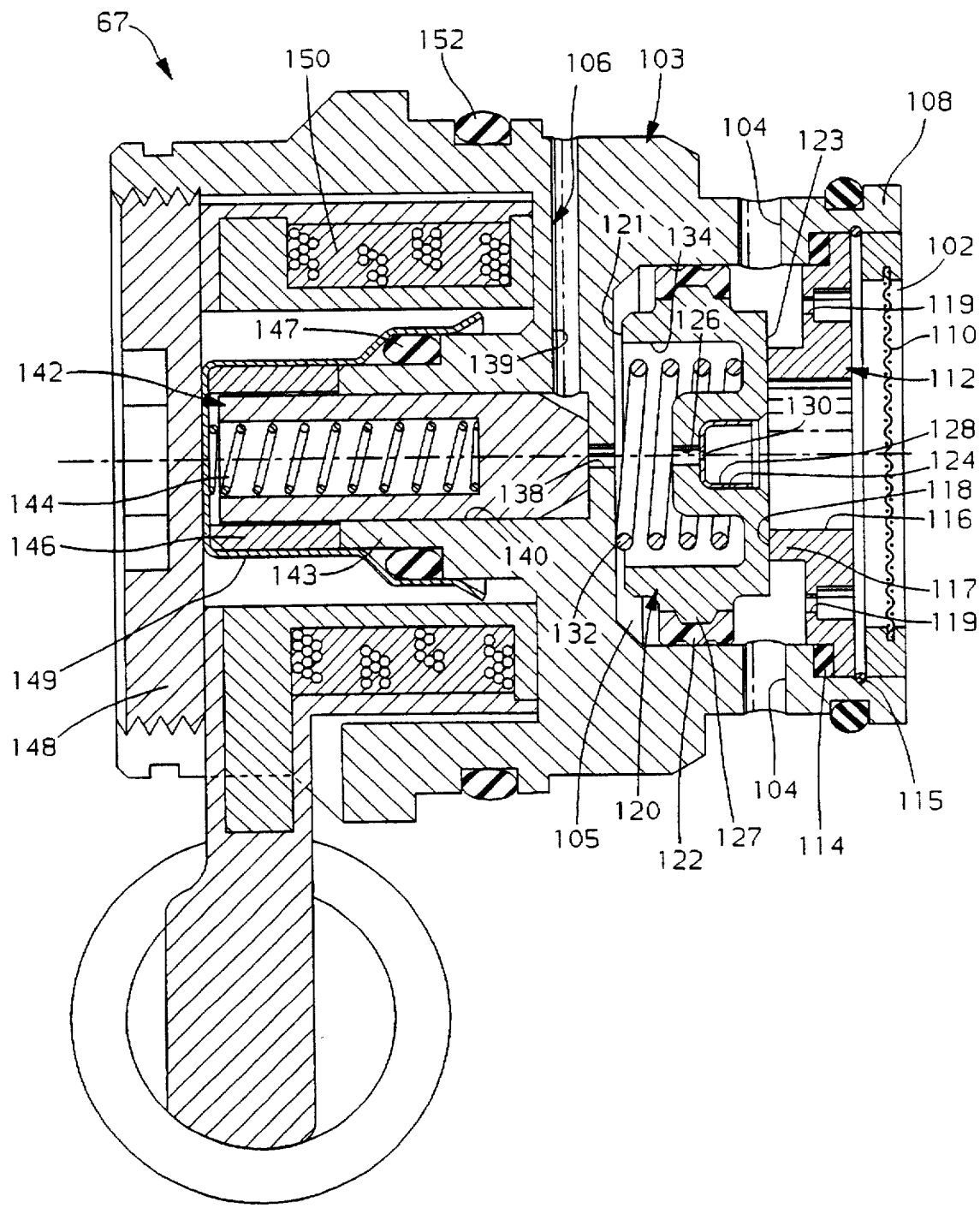
FIG. 3 is a fragmentary cross-sectional view of a damper control valve in a normally closed position.

Referring additionally to FIG. 3, the damper control valve 67 includes an inlet 102 which is in fluid communication with the low level damping valve assembly 64. The damper control valve 67 also includes a series of main outlet openings, representative of which is outlet opening 104. Outlet 104 communicates through the body 103 and into internal cavity 105. A pilot outlet 106 also communicates with internal cavity 105 and extends through body 103.

The body 103 includes an annular leg 108 that internally carries a filter 110. The filter 110 spans across the inlet 102 and prevents contaminates from entering the damper control valve 67. A calibration plate 112 is positioned within internal cavity 105 inside filter 110 and engages an annular gasket 114 in order to sealingly mate with body 103. The calibration plate is maintained in position by a ring clip 115.

The calibration plate 112 includes a central flow opening 116 which is defined by annular wall 117. Annular wall 117 additionally forms a seat 118 at its upper end for engagement with the valve disc 120. The calibration plate 112 also includes a series of optional calibration orifices, representative of which is calibration orifice 119. The calibration orifice 119 provides a continuously open flow path between the inlet 102 and the main outlet opening 104 according to predetermined performance criteria of the damper 10.

The valve disc 120 includes an annular rib 127 which carries a seal 122. The seal 122 engages the body 103 within internal cavity 105 to prevent fluid flow past the outer perimeter of the valve disc 120, while concurrently allowing the valve disc to move. The valve disc 120 is biased toward the seat 118 by a spring 132. The spring is carried in an annular trough 134 that is formed in the side 121 of the valve disc 120.

A recess 124 is formed in the center of valve disc 120 and communicates with opening 126 forming a passage through the valve disc 120. The recess 124 carries a cup-shaped restrictor 128 which includes a calibrated orifice 130 that continuously permits fluid communication through the valve disc 120 between the recess 124 and the opening 126. Optionally, the calibrated orifice 130 is formed directly in the valve disc 120 as the opening 126. However, providing a separate restrictor 128 provides a means of conveniently tuning the damper control valve 67.

The pilot outlet 106 includes a longitudinal leg 138 and a lateral leg 139 each of which intersect with armature bore 140. The armature bore 140 extends through annular extension 143 of the body 103 and slidably carries an armature 142. The armature 142 is biased by a spring 144 to normally close the pilot outlet 106 by interrupting fluid communication through the armature bore 140 between longitudinal leg 138 and lateral leg 139.

A cylindrical spacer 146 is positioned about the armature 142 adjacent armature bore 140. The cylindrical spacer 146, the spring 144 and the armature 142 are maintained in position by a retainer 148 which threadedly engages the body 103 and a cup-shaped retainer spacer 149 which is positioned over the cylindrical spacer 146 with a seal 147 engaging the retainer spacer 149 and the body 103 to maintain a dry coil assembly 150. Another seal 152 is carried about the body 103 and engages the valve boss 68 of the damper 10.

When the coil assembly 150 is not energized the spring 144 urges the armature 142 to close the pilot outlet 106. Fluid pressure at inlet 102 is communicated through calibrated orifice 130 to the side 121 of valve disc 120 urging the valve disc 120 onto seat 118 with the assistance of spring 132. The fluid pressure communicated through the inlet 102 to the side 123 of the valve disc 120 operates on a substantially smaller area of valve disc 120 than the fluid pressure on the side 121 and therefore, the valve disc 120 remains upon the seat 118. The continuously open flow path provided by calibration orifice 119 allows some fluid flow through the calibration plate 112 from the inlet 102, which is readily expelled through the main outlet opening 104.

Spring 132 is instrumental in enabling the adaptability of the damper control valve 67 to the embodiment of FIG. 2. This is because the spring, in combination with the calibrated orifice 130, can be tailored to permit unseating of the valve disc 120 at a selected instantaneous pressure.

Figure 4:
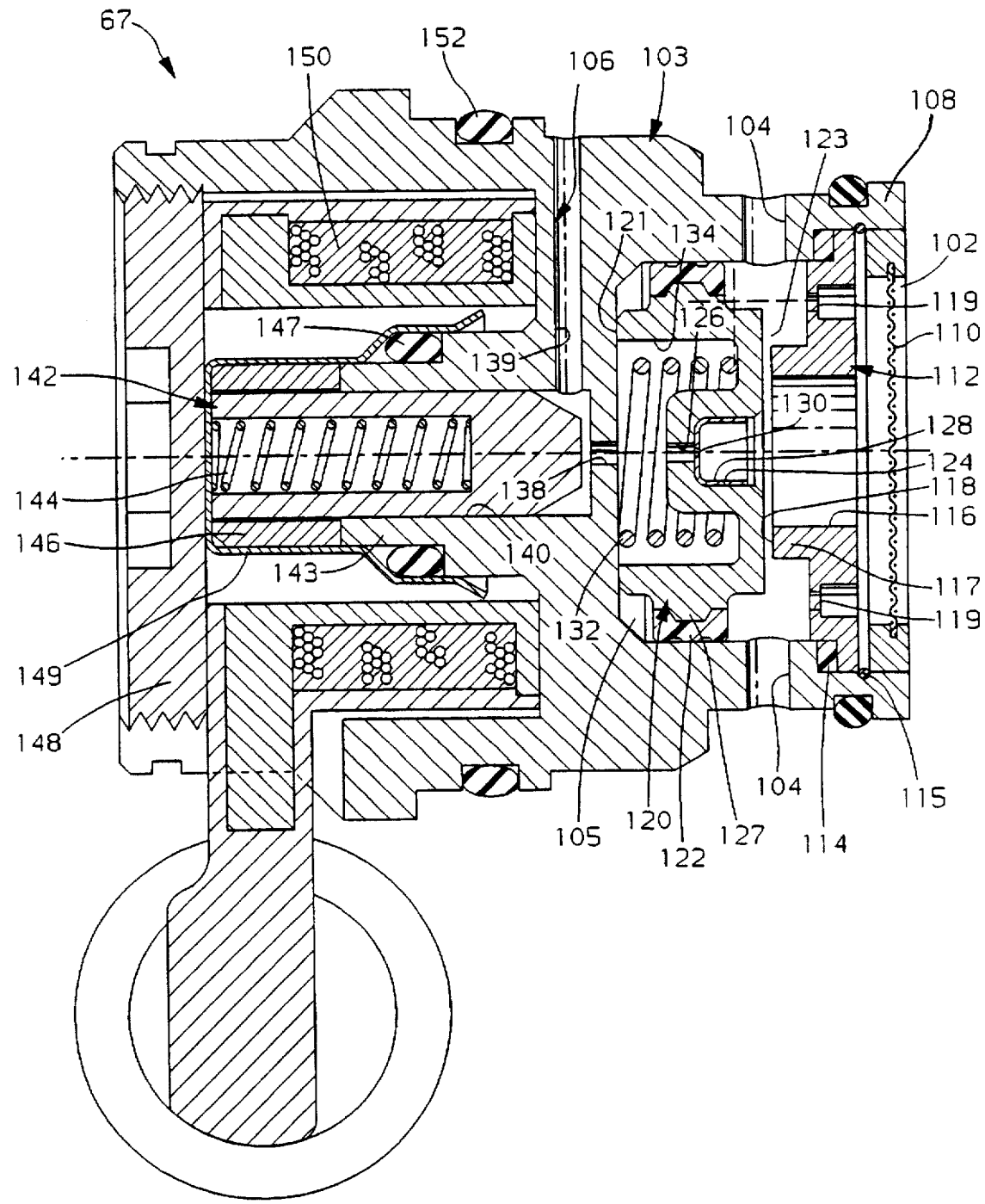
FIG. 4 is a fragmentary cross-sectional view of a damper control valve in an open condition resulting from solenoid energization.

Referring to FIG. 4, the damper control valve 67 is shown in its opened position. The coil assembly 150 is energized which causes the armature 142 to move to compress the spring 144 thereby opening a flow path through the pilot outlet 106 from the internal cavity 105. This results in a rapid decrease in pressure on side 121 of the valve disc 120 such that the pressure on the side 123 due to in-flow from the inlet 102 causes the valve disc 120 to move to compress spring 132 opening the main outlet opening 104 to the inlet 102 permitting a substantial amount of flow through the damper control valve 67.

When the damper control valve 67 is not energized, fluid flow to the main outlet opening 104 from the inlet 102 is substantially blocked. This substantially prevents the flow of fluid through low level damping valve assembly 64 and therefore, the damping characteristics of the damper 10 are provided by the valve assembly 32 in the piston 26 and the valve assembly 35 in the cylinder end assembly 34. This provides a firm performance mode for the damper 10.

When the damper control valve 67 is open permitting fluid flow between the inlet 102 and the main outlet opening 104, fluid flow is permitted through the low level damping valve assembly 64. This provides a soft performance mode for the damper 10. During this mode fluid flow is routed through the by-pass channel 54 to the reservoir 24, instead of through the valve assembly 35 with the piston 26 acting as a pump.

Figure 5:
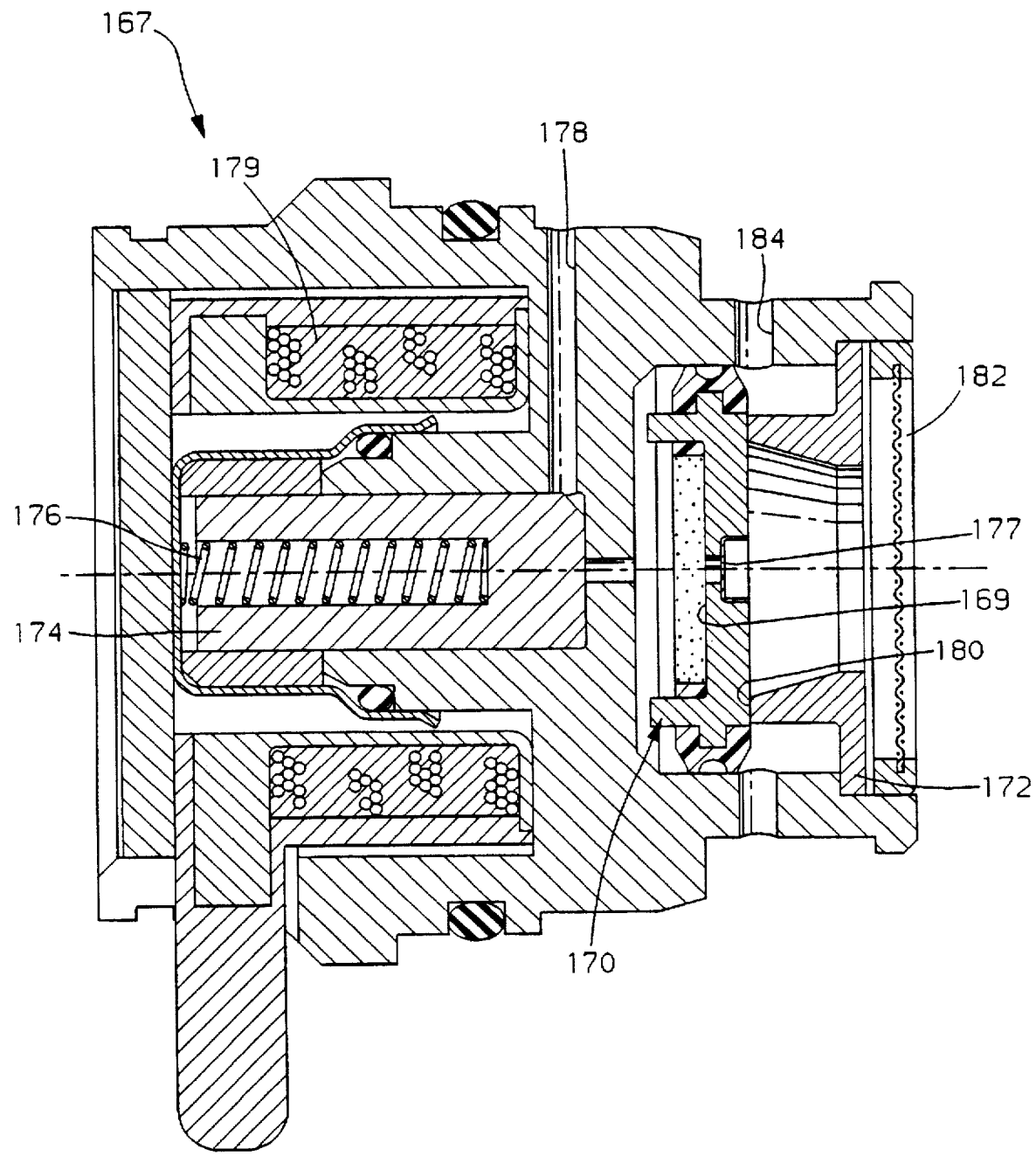
FIG. 5 is a fragmentary cross-sectional view of an alternative damper control valve.

Referring to FIG. 5, a second embodiment of the present invention is illustrated and is designated generally as damper control valve 167. The damper control valve 167 is substantially identical in operation to the damper control valve 67 as illustrated in FIGS. 3 and 4 except that no spring is provided on the side 169 of valve disc 170. In addition, no calibration orifices are provided in the plate 172 and therefore, no tuning for the de-energized pressure curve of the damper 10 is provided.

Damper control valve 167 is illustrated in the de-energized state and therefore, the armature 174 is urged by spring 176 to close the pilot opening 178. The valve disc 170 is maintained upon the seat 180 solely by the application of fluid pressure to the side 169 of valve disc 170 through the continuously open restrictive orifice 177.

When the coil 179 is energized and the armature 174 is moved to open the pilot opening 178, a resulting reduction in pressure on the side 169 of valve disc 170 effects a rapid opening of the damper control valve 167 permitting fluid to communicate from the inlet 182 to the main outlet opening 184.

What is claimed is:

1. A damper control valve comprising:

a one-piece body with a cavity and having an inlet with a plate forming a central flow opening, a main outlet and a pilot outlet all communicating with the cavity;

a valve disc carried in the cavity having a restrictive orifice and normally closing the central flow opening off from the main outlet, the restrictive orifice providing a continuous opening between the central flow opening and the pilot outlet;

an armature being separate from the valve disc and normally closing the pilot outlet wherein the armature is movable to open the pilot outlet and wherein the armature is carried in an armature bore formed in an annular extension of the body, with the pilot outlet extending through the armature bore with a longitudinal leg that opens to the cavity and a lateral leg that exits the body;

a cylindrical spacer positioned about the armature adjacent the armature bore and against the annular extension of the body;

a cup-shaped retainer spacer positioned over the cylindrical spacer and the annular extension with a seal positioned between the retainer spacer and the annular extension providing a fluid-tight seal therebetween;

an armature spring extending between the retainer spacer and the armature and normally biasing the armature to close the pilot opening;

a retainer fixedly engaged with the body and engaging the retainer spacer maintaining the cylindrical spacer, the retainer spacer and the armature springing position; and a coil positioned in the body and energizable to cause the armature to move to compress the armature spring opening the pilot opening and allowing the valve disc to move, opening the central flow opening to the main outlet.

2. A damper control valve according to claim 1 having a calibration orifice formed in the plate and disposed in parallel to the central flow opening providing a continuous opening between the inlet and the main outlet through the cavity.

3. A damper control valve according to claim 1 further comprising a spring biasing the valve disc to a closed position.

4. A damper control valve according to claim 3 wherein when the armature is moved to open the pilot outlet the valve disc moves compressing the spring to open the central flow opening to the main outlet in response to a pressure differential across the restrictive orifice.

5. A damper control valve according to claim 4 further comprising a seal carried by an annular rib on the valve disc and engaging the body within the cavity.

6. A damper control valve comprising:

a body having a cavity, an inlet with a central flow opening communicating with the cavity, a main outlet and a pilot outlet communicating with the cavity;

a valve disc carried in the cavity having a restrictive orifice formed by a cup-shaped restrictor carried in a recess of the valve disc, the valve disc normally closing the central flow opening off from the main outlet, and the restrictive orifice providing a continuous opening between the central flow opening and the pilot outlet, wherein the valve disc includes an annular rib carrying a resilient seal that bears against body;

an armature normally closing the pilot outlet wherein the armature is movable to open the pilot outlet and wherein the armature is carried in an armature bore formed in an annular extension of the body, with the pilot outlet extending through the armature bore and having a longitudinal leg that opens to the cavity and a lateral leg that exits the body;

a calibration plate extending across the inlet of the body and forming the central flow opening with at least one calibration orifice extending through the calibration plate and disposed in parallel with the central flow opening providing a continuous opening from the inlet of the body to the cavity so that fluid can flow through the damper control valve from the inlet to the main outlet regardless of the valve disc and armature positioning wherein the calibration plate includes an annular wall extending into the cavity and forming a seat for engagement with the valve disc and maintaining the valve disc in a position such that the calibration orifice is open to the main outlet through the cavity;

a cylindrical spacer positioned about the armature adjacent the armature bore and against the annular extension of the body;

a cup-shaped retainer spacer positioned over the cylindrical spacer and the annular extension with a seal positioned between the retainer spacer and the annular extension providing a fluid-tight seal therebetween;

a spring extending between the retainer spacer and the armature and normally biasing the armature to close the pilot opening;

a retainer fixedly engaged with the body and engaging the retainer spacer maintaining the cylindrical spacer, the retainer spacer and the spring in position; and a coil positioned in the body and energizable to cause the armature to move to compress the spring opening the pilot opening and allowing the valve disc to move, opening the central flow opening to the main outlet wherein to provide a firm performance mode the coil is de-energized so that fluid flow from the inlet to the main outlet is substantially blocked and to provide a soft performance mode the coil is selectively energized permitting a substantial fluid flow from the inlet to the main outlet.

* * * * *